United States Patent Office 3,318,568
Patented May 9, 1967

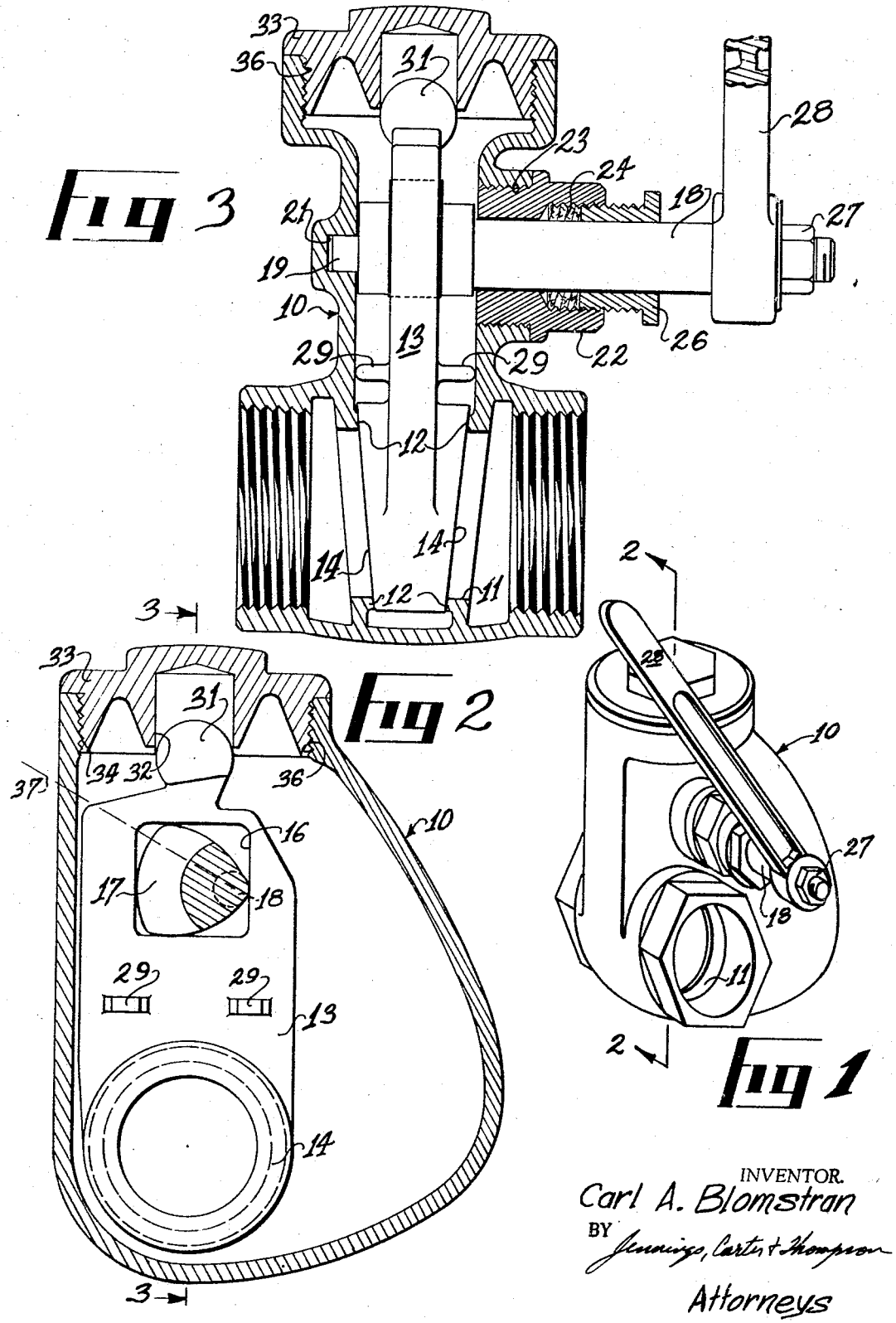

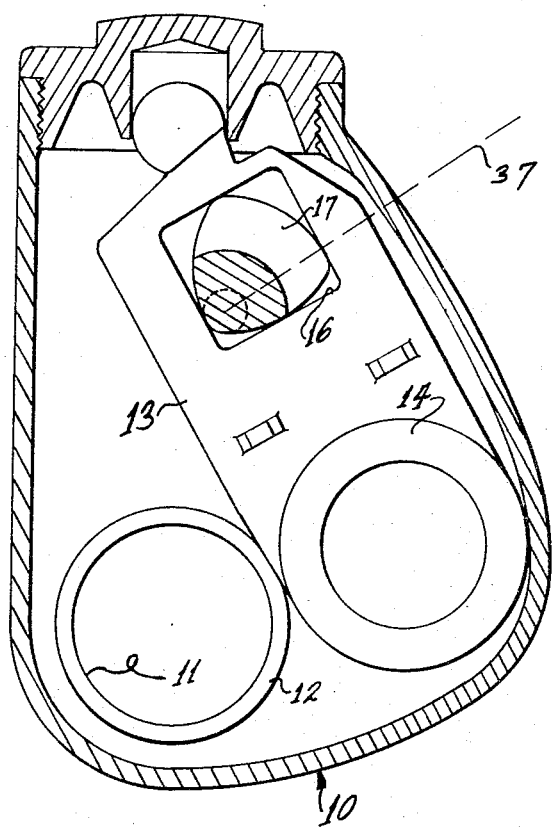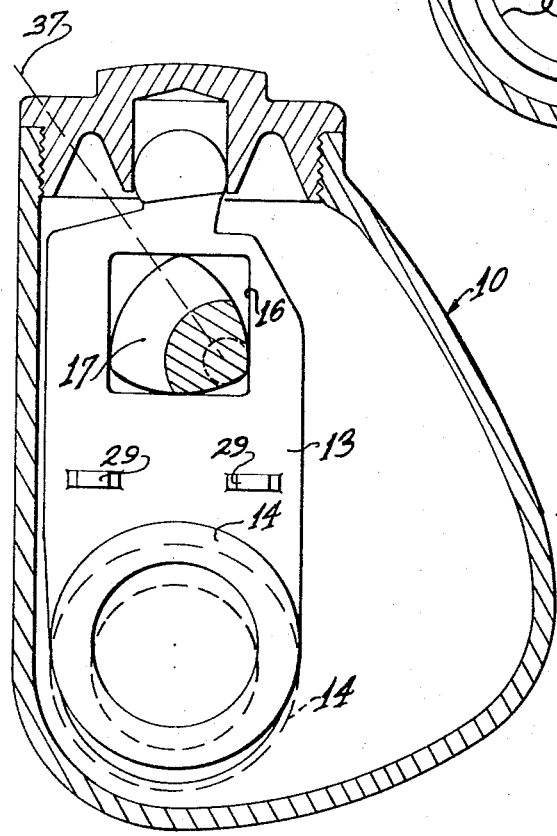

3,318,568
VALVE ACTUATING MECHANISM
Carl A. Blomstran, Birmingham, Ala., assignor to Stockham Valves & Fittings, Inc., a corporation of Delaware
Filed Aug. 13, 1964, Ser. No. 389,260
4 Claims. (Cl. 251—259)

This invention relates to valve actuating mechanism and more particularly to actuating mechanism for moving a first valve seat mounted adjacent the end of a gate valve disc toward and away from a second valve seat carried by the valve body.

An object of my invention is to provide valve actuating mechanism which shall include a gate valve disc which moves in a straight line as it moves into and out of contact with its seat during movement of the disc toward open and closed positions whereby the disc is unseated prior to swinging in an arcuate path toward open position.

Another object of my invention is to provide valve actuating mechanism in which a greater seating force than present actuating mechanisms produce can be obtained.

A further object of my invention is to provide valve actuating mechanism of the character designated which shall be positive in operation and one which will not vibrate away from closed or opened positions once the valve is set in these positions.

A further object of my invention is to provide valve actuating mechanism of the character designated which shall include improved means for guiding movement of the disc as it moves toward and away from opened and closed positions whereby the valve seats carried by the disc are not damaged by contact with the inner surface of the valve body.

A still further object of my invention is to provide valve actuating mechanism of the character designated which shall be simple of construction, economical of manufacture and one in which there is a minimum of wear to the moving parts as the valve is actuated.

Briefly, my improved valve actuating mechanism comprises a gate valve disc having an opening therethrough intermediate the ends thereof to define a closed yoke-type cam follower. A rotatable stem extends through the opening and carries a cam which is disposed to engage the inner surface of the closed cam follower. The cam follower is provided with straight line contact surfaces whereby upon relative movement of the cam and the cam follower, the disc moves in a substantially straight line as it moves into and out of contact with the valve seat associated therewith during movement of the disc selectively to open and closed positions. Retaining means is provided adjacent the opposite end of the disc from the end thereof which engages the valve seat in position to limit lateral movement of this end of the disc to thereby permit pivotal movement of the other end of the disc relative to the valve seat.

Apparatus embodying features of my invention is illustrated in the accompanying drawings, forming a part of this application, in which:

FIG. 1 is a perspective view showing a valve having my improved actuating mechanism associated therewith;

FIG. 2 is an enlarged sectional view taken generally along the line 2—2 of FIG. 1 showing the disc in closed position;

FIG. 3 is a sectional view taken generally along the line 3—3 of FIG. 2;

FIG. 4 is a sectional view corresponding to FIG. 2 but showing the disc in unseated position; and, FIG. 5 is a sectional view corresponding to FIGS. 2 and 4 showing the disc moved to fully opened position.

Referring now to the drawings for a better understanding of my invention, I show a valve body 10 having a fluid passageway 11 therethrough for conveying any fluid, such as liquids, gases or the like. Tapered seats 12 are provided adjacent the passageway 11, as shown in FIG. 3.

Mounted within the valve body 10 is a valve disc 13 having tapered valve seats 14 at opposite sides thereof which correspond to the tapered valve seats 12 carried by the valve body 10. The valve disc 13 is elongated, as shown, and is provided with an opening 16 intermediate the ends thereof defining a closed yoke-type cam follower. As shown in FIGS. 2, 4 and 5, the closed cam follower 16 is provided with four sides which provide four straight line surfaces in position to be engaged by a cam 17.

As shown in FIGS. 2–5, the cam 17 is formed integrally with a valve stem 18. The inner end of the valve stem 18 is reduced in diameter as at 19 and rotates within a recess 21 provided in the inner surface of the valve body 10. Surrounding the valve stem 18 is a stuffing box 22 having suitable external threads thereon which are in threaded engagement with a threaded opening 23 provided in the valve body 10 in alignment with the recess 21. Suitable packing 24 surrounds the stem 18 within the confines of the stuffing box 22 and is held in position by a packing nut 26. Secured rigidly to the outer end of of the valve stem 18 by a retaining nut 27 is one end of an operating lever 28.

As shown in FIGS. 2, 4 and 5, the valve body 10 is provided with a widened portion whereby the disc 13 is adapted to move from the closed position shown in FIG. 2 to the open position shown in FIG. 5. To prevent the valve seats 14 from rubbing against the inner surface of the valve body 10, outwardly projecting guide members 29 are carried by the disc 13 in position to engage the inner walls of the valve body, as shown in FIG. 3.

To restrain lateral movement of the end of the disc 13 opposite the end thereof carrying the valve seat 14, a ball-like member 31 is formed integrally with that end of the disc 13 in position to engage a recess or socket 32 provided in a cap member 33. Suitable threads 34 are provided on the cap 33 in position to engage a threaded opening 36 provided in the valve body 10. As shown in FIGS. 2–5, the socket 32 is of a size and in position to limit lateral movement of the ball-ilke member 31 and at the same time permit free sliding movement of the ball-like member relative to the socket, whereby the disc 13 is adapted to move from seated position shown in FIG. 2 to unseated position shown in FIG. 4. That is, the valve seat 14 moves from the dotted line position shown in FIG. 4 to the solid line position whereby the tapered seats 12 and 14 are separated from each other to thus permit free arcuate movement of the disc 13 to the fully open position shown in FIG. 5. In FIGS. 2, 4 and 5, the position of the operating lever 28 relative to the disc 13 and the valve body 10 is indicated by the dotted lines 37.

From the foregoing description, the operation of my improved valve actuating mechanism will be readily understood. To assemble the valve, the disc 13 is inserted into the body 10 through the threaded opening 36 and the cap 33 is secured in place by engagement of the threads 34 with the threaded opening 36. The stuffing box 22, together with the packing 24 and the packing nut 26 are assembled about the valve stem 18 and the valve stem is inserted through the threaded opening 23 whereby the cam 17 is positioned inwardly of the closed yoke-type cam follower 16. The reduced diameter portion 19 of the stem 18 enters the bearing recess 21, as shown. The stuffing box 22 is then rotated relative to the threaded opening 23 whereby the stuffing box is secured to the valve body 10.

The four sides of the closed cam follower 16 are so positioned that upon rotation of the cam 17, the disc 13 is first lifted from the position shown in FIG. 2 to the position shown in FIG. 4. Continued rotation of the cam 17 causes the disc 13 to move from the position shown in FIG. 4 to the fully open position shown in FIG. 5. In view of the fact that the socket 32 permits free sliding movement of the ball-like member 31 relative thereto but limits lateral movement of the ball-like member, the disc 13 is free to move axially of the recess 32. The disc 13 pivots relative to the recess 32 as it moves from the unseated position shown in FIG. 4 to the open position shown in FIG. 5.

To close the valve, the operating lever 28 is moved in the opposite direction whereby the disc 13 moves from the position shown in FIG. 5 to the position shown in FIG. 4. As the operating lever 28 is rotated further, the valve seat 14 of the disc 13 moves from the solid line position shown in FIG. 4 to the dotted line position whereby the disc is seated. As shown by the dotted lines 37 in FIGS. 2 and 5, the operating lever 28 extends outwardly whereby the weight of the lever arm tends to hold the disc 13 in either the closed or open position, as the case may be. Accordingly, the weight of the operating lever would tend to prevent vibration of the disc away from closed or open position.

While I have shown the disc 13 as being formed in one piece, it will be apparent that it could be formed with flexible seating surfaces.

From the foregoing, it will be seen that I have devised improved valve actuating mechanism for a gate valve wherein the disc travels in a straight line as it moves into and out of contact with its seat and moves in an arcuate path the remainder of the distance to open or close the valve quickly. Accordingly, the first motion of the valve seat carried by the disc is to unseat the disc whereby there is no arcuate movements of the valve seats relative to each other until the disc has been unseated. By providing a relatively long operating lever, together with an operating cam which has a relatively short radius, a substantial amount of seating force may be applied with a minimum of effort. The cam 17 also tends to lock the disc in either open or closed position.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In actuating mechanism for moving a first valve seat mounted adjacent one end of a gate valve disc toward and away from a second valve seat carried by a valve body:
   (a) a pivot member adjacent the opposite end of said disc from said first valve seat,
   (b) means limiting lateral movement of said pivot member relative to the valve body and permitting free, straight line sliding of said pivot member toward and away from said second valve seat so that said first valve seat is adapted to move in a straight line toward and away from seated position and then in an arcuate direction to open and closed positions,
   (c) there being an opening through said disc intermediate said pivot member and said first valve seat defining a closed yoke-type cam follower,
   (d) a rotatable stem extending through said opening,
   (e) a cam carried by said stem engaging said cam follower and defining therewith a positive motion cam which permits motion of said disc only with motion of said cam,
   (f) said cam and closed yoke-type cam follower being of a shape and arranged to move said first valve seat in a substantially straight line into and out of contact with said second valve seat and limit movement of said first valve seat to substantially straight line movement as it moves into and out of contact with said second valve seat, and
   (g) said cam and closed yoke-type cam follower also being of a shape and arranged to move said first valve seat in an arcuate path selectively from closed to open positions after said first valve seat is moved to unseated position relative to said second valve seat.

2. In actuating mechanism as defined in claim 1 in which the pivot member comprises a ball-like member, there being a socket in said valve body having straight line side walls for receiving said ball-like member.

3. In actuating mechanism as defined in claim 1 in which the opening through said disc is provided with four sides.

4. In actuating mechanism as defined in claim 1 in which outwardly projecting guide members are carried by opposite sides of said disc in position to engage inner surfaces of the valve body to retain said first valve seat out of contact with said valve body after being unseated.

References Cited by the Examiner
UNITED STATES PATENTS

| 713,851 | 11/1902 | Cash | 251—327 X |
| 1,688,686 | 10/1928 | Carlson | 251—302 |

FOREIGN PATENTS

| 706,845 | 4/1931 | France. |
| 1,053,060 | 9/1953 | France. |

WILLIAM F. O'DEA, *Primary Examiner.*

D. R. MATTHEWS, *Assistant Examiner.*